(12) United States Patent
Jokinen

(10) Patent No.: US 6,398,496 B1
(45) Date of Patent: Jun. 4, 2002

(54) MINIMIZING WIND FORCES ON HELICOPTER BLADES

(76) Inventor: Teppo K. Jokinen, 1009 S. Federal Hwy. #4, P.O. Box 806, Lake Worth, FL (US) 33460

(*) Notice: Subject to any disclaimer, the term of this patent is extended or adjusted under 35 U.S.C. 154(b) by 0 days.

(21) Appl. No.: 09/637,370

(22) Filed: Aug. 15, 2000

(51) Int. Cl.$^7$ ................................................ B64C 27/51
(52) U.S. Cl. ........................... 416/1; 416/105; 416/106; 416/156; 416/158; 416/500
(58) Field of Search ................. 416/1, 40, 41, 416/156, 158, 500, 145, 103, 105, 106, 107

(56) References Cited

U.S. PATENT DOCUMENTS 2,465,681 A * 3/1949 Gluhareff .................... 416/106
3,361,216 A * 1/1968 Walker ....................... 415/500

FOREIGN PATENT DOCUMENTS

SE         7707210-6 A  *  1/1979  ................... 416/41

* cited by examiner

Primary Examiner—Christopher Verdier
(74) Attorney, Agent, or Firm—A. David Pellinen

(57) ABSTRACT

Helicopter blades each have a piston connected to it. The pistons are movable within a cylinder between innermost and outermost positions. The hydraulic fluid of each cylinder is connected to other cylinders by a hydraulic tube or through a manifold. A drive bar moving synchronously with the blades is connects to the cylinders. As the helicopter moves in flight the force of the wind against a blade causes a piston to move inwardly. This causes fluid to be expelled from the cylinder into the another cylinder by way of the hydraulic tube causing other piston to be moved outwardly. Meanwhile the other piston, because it is moving with the wind, is exerting an opposite effect on the other piston. The result is a tendency for the blades to approach an equilibrium condition with respect to the wind forces to minimize the shocks to the overall system.

16 Claims, 3 Drawing Sheets

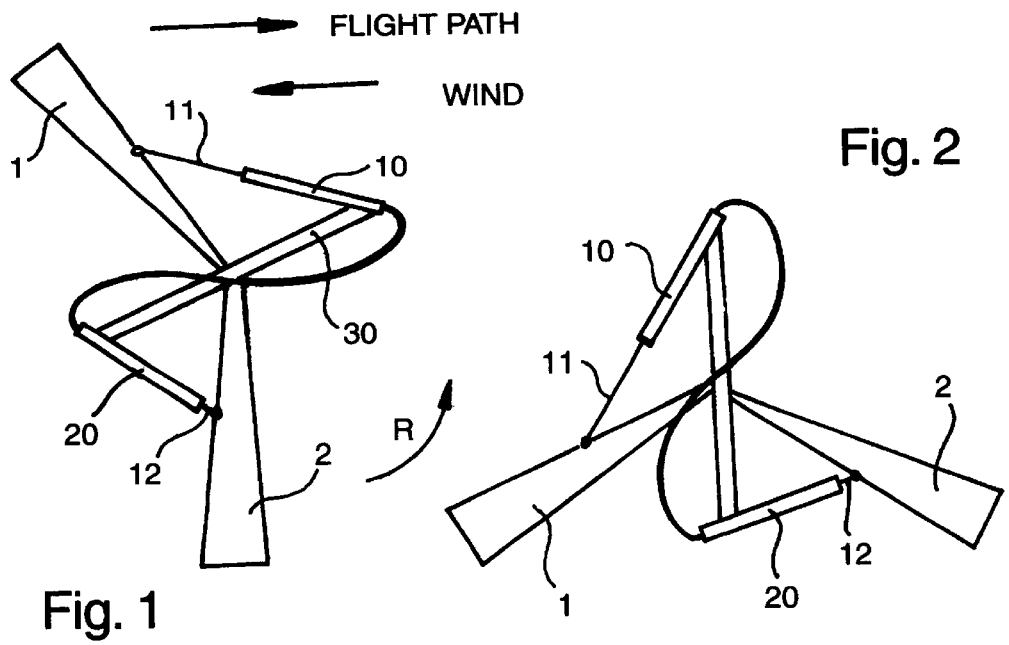
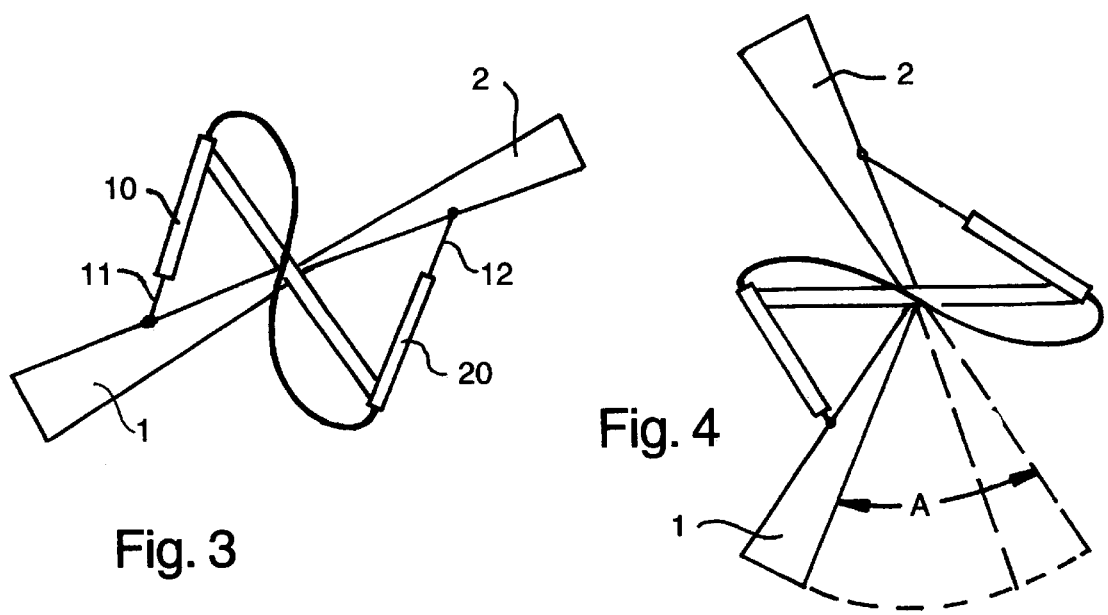

MINIMIZING WIND FORCES ON HELICOPTER BLADES

BACKGROUND OF THE INVENTION

1. Field of the Invention

This invention relates to improvements in helicopter blades with a view to minimizing vibrations in the blades and its supporting structure.

2. Description of the Related Art

Helicopter blades encounter substantial wind forces when they move in relatively horizontal planes or directions as opposed to vertical planes or directions. As the blades rotate they encounter additive or subtractive wind forces, subtractive with the wind and additive against the wind. As they rotate from an additive to a subtractive wind force the substantially instantaneous change in wind direction causes stresses and consequent shocks to the blade system. The resultant shock waves can do great damage to the blades and the support system.

SUMMARY OF THE INVENTION

This invention provides hydraulic pistons to minimize the shock as helicopter blades encounter different wind forces. The blades of a helicopter each have a hydraulic cylinder and piston connected to it. The pistons are movable within a cylinder between innermost and outermost positions. The hydraulic fluid of each cylinder is connected to another cylinder by a hydraulic tube or through a manifold. A drive bar connects to the cylinders and is driven by the engine.

As the helicopter moves in flight one of the blades may move against the wind while the other moves with the wind. The force of the wind against a blade causes a first piston to move inwardly. This causes fluid to be expelled from the cylinder into the other cylinder by way of the hydraulic tube. The force of the fluid causes the second piston to be moved outwardly. Meanwhile the second piston, because it is moving with the wind, is exerting an opposite effect on the other piston. The result will be a tendency for the blades to approach an equilibrium condition with respect to the wind forces to minimize the shocks to the overall system.

BRIEF DESCRIPTION OF THE DRAWINGS

FIG. 1 is a top view of two helicopter blades in one position;

FIG. 2 shows the blades moved to another position;

FIG. 3 shows continued movement of the blades to yet another positron;

FIG. 4 is an illustration to show angular movement of a blade;

DETAILED DESCRIPTION OF THE INVENTION

Figure 5:
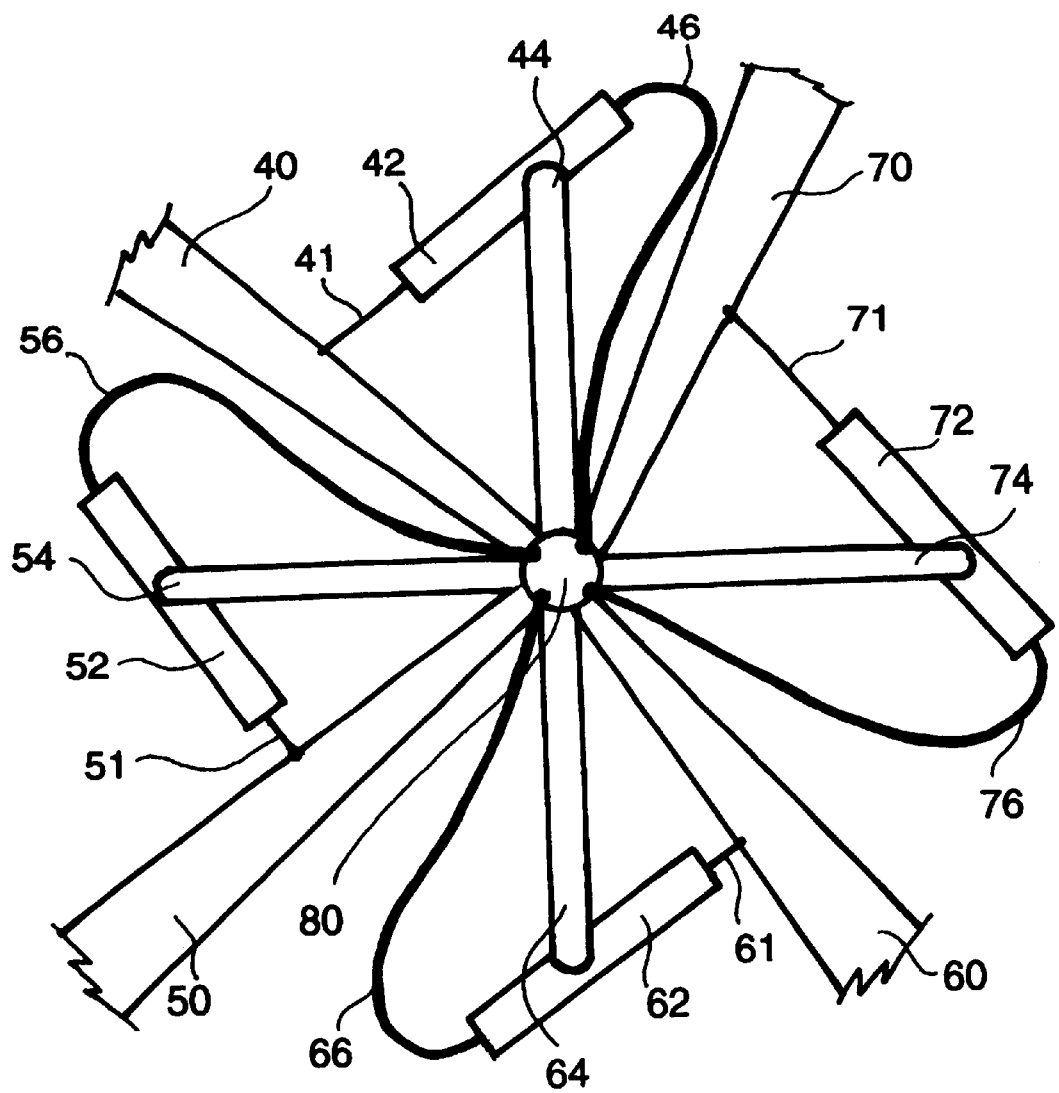
FIG. 5 shows the use of a manifold.

The drawings show in highly exaggerated form the movements of helicopter blades and hydraulic piston shafts. It is understood the drawings are for illustrative purposes only. The description assumes some conditions: one, the helicopter is moving in the direction FLIGHT PATH and second, the direction WIND is the direction of the force of the wind, or wind force, applied against the helicopter blades. The wind force is considered a DOWN WIND force when a blade is moving with the wind and the wind force is considered an UP WIND force when a blade is against the wind. The conditions shown are of course variable, there can be and are abrupt changes. Further, it is well known that the wind and blade movements are complex. However, the complex patterns do riot affect the basic overall operation of the invention. Like reference numerals show like elements in the drawings.

FIG. 1 shows helicopter blades 1 and 2 rotating counterclockwise as shown by the arrow R, the actual helicopter moving in the direction labeled FLIGHT PATH. The figures show two helicopter blades but it is understood there can be any number of blades as is known in the helicopter art. Helicopter blade 1 is associated with hydraulic cylinder 10 and helicopter blade 2 is associated with hydraulic cylinder 20. Each hydraulic cylinder has a first end through which a movable piston shaft 11, 12 is connected to the blades 1 and 2, respectively. The opposite ends of the cylinders are connected to the ends of an associated drive bar 30 which is driven by the engine while the blades move independently according to the hydraulic pressure in the cylinders. The piston shafts extend through an end of the hydraulic cylinder and can move in and out, or put another way, away or toward the helicopter blade. For illustrative purposes the shaft 11 is shown fully extended and the shaft 12 is shown fully retracted.

Now let us assume the blades have moved to the position shown in FIG. 2. As blade 1 moves from DOWN WIND into the UP WIND area blade 1 encounters resistance to cause the blade to be moved clockwise against its counterclockwise movement it had when it entered the UP WIND area. This causes the piston shaft to be moved inwardly and hydraulic fluid therein to flow through the hydraulic tube into the cylinder 20, in turn causing the piston and the piston shaft to move outwardly.

The result of this movement is shown in FIG. 3. The force of the wind has caused the shaft 11 to retract into the cylinder 10 and the concurrent flow of hydraulic fluid from cylinder 10 into cylinder 20 causing shaft 12 to extend outwardly. This extended movement of the piston shaft 12 has caused the piston shaft blade 2 to rotate in a counterclockwise further than it would in the absence of any pistons.

FIG. 4 shows blade 1, in solid lines, when shaft 11 is fully retracted. Dotted lines shows blade 1 when the shaft is fully extended. The angle A shows how much the blade 1 moves during a complete revolution due to piston shaft movement. It is important to note the actual positions and angles are shown in highly exaggerated form to illustrate the invention.

FIG. 5 shows the preferred use of a manifold with the hydraulic tubes. Rather than connecting the hydraulic tubes directly between hydraulic cylinders the tubes are connected from a hydraulic cylinder to a manifold. In the embodiment of FIG. 5 a manifold 80 is provided. In FIG. 5 there are helicopter blades 40, 50, 60 and 70. Hydraulic cylinders 42, 52, 62 and 72 with movable piston rods 41, 51, 61 and 71 are associated with blades 40, 50, 60 and 70, respectively, such that piston 41 is connected to blade 40, rod 51 to blade 50, rod 61 to blade 60, and rod 71 to blade 70. Manifold 80 connects to ends of hydraulic cylinders 42, 52, 62 and 72 by way of hydraulic tubes 46, 56, 66 and 76.

FIG. 5 also illustrates that a drive bar need not be connected to the end of a hydraulic tube. In FIG. 5 drive bar 44 is connected intermediate the ends of hydraulic cylinder 42.

As the wind forces impinge on the helicopter blades the movable pistons will extend or retract toward or away from an associated blade. The result will be a tendency for the blades to approach an equilibrium condition with respect to the wind forces and this will minimize the shock to the helicopter blades and the supporting structure.

With more than two blades a manifold communicates with each hydraulic cylinder. For X number of helicopter blades there will be X number of cylinders and a single manifold communicating with the X cylinders. The exact location of the drive bar on the hydraulic cylinder will depend on the number of factors such as the number of blades provided.

Because there is a single manifold the wind forces and the hydraulic cylinders will work in the dame manner as described with respect to FIGS. 1–4. As the forces against the blades vary the forces act concurrently on each of the hydraulic cylinders and associated piston shafts to minimize the shocks normally encountered.

Figure 6:
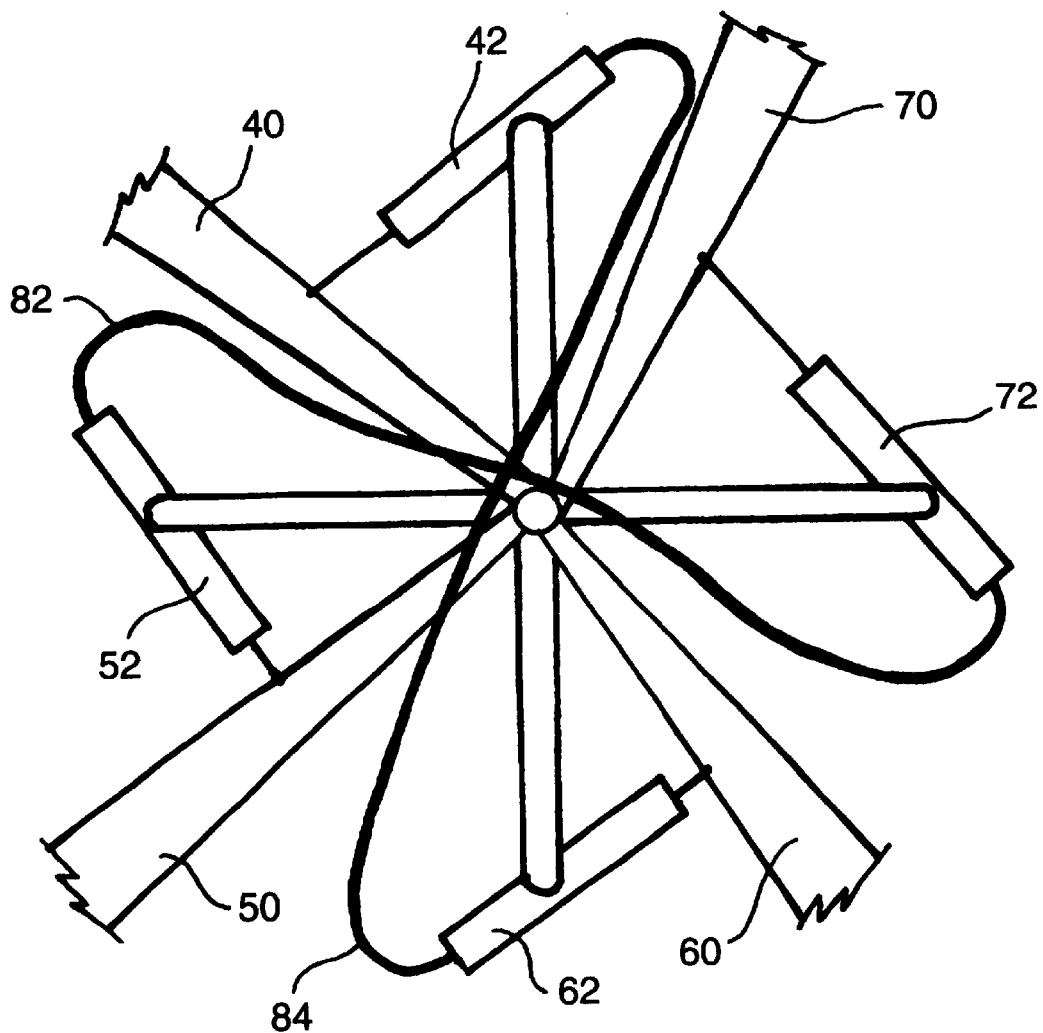
FIG. 6 shows the use of opposite blades sharing a hydraulic tube.

FIG. 6 is similar to FIG. 5 in that there four helicopter blades. In FIG. 6 the hydraulic tubes do not go to a manifold but instead, with an even number of blades, the tubes go to opposite cylinders. Thus, a single hydraulic tube 84 interconnects second ends of hydraulic cylinders 42 and 62. Similarly, a single hydraulic tube 82 interconnects second ends of hydraulic cylinders 52 and 72.

I claim:

1. Apparatus for minimizing the effect of wind forces on helicopter blades and supporting structure comprising:

a plurality of hydraulic cylinders each with hydraulic fluid therein and having first and second ends;

a plurality of movable piston shafts, each of said piston shafts connected to an associated helicopter blade;

each piston shaft movable only through said first end of its associated hydraulic cylinder;

a hydraulic tube connected only from said second end of its associated hydraulic cylinder to said second end of a further hydraulic cylinder;

whereby hydraulic fluid may flow between said hydraulic cylinders so that said movable piston shafts may extend through said one end of an associated cylinder toward or away from an associated blade as said wind forces impinge on said helicopter blades.

2. The apparatus of claim 1 further comprising:

a manifold;

said hydraulic tube is comprised of a plurality of tubes; and each of said plurality of tubes are connected at one of their ends to said second end of art associated hydraulic cylinder and at their other ends to said manifold.

3. The apparatus of claim 1 further comprising a plurality of drive bars each connected to an associated one of said plurality of hydraulic cylinders.

4. The apparatus of claim 2 further comprising a plurality of drive bars each connected to an associated one of said plurality of hydraulic cylinders.

5. The apparatus of claim 3 wherein said drive bars are connected to an end of an associated hydraulic cylinder.

6. The apparatus of claim 4 wherein said drive bars are connected to an end of an associated hydraulic cylinder.

7. The apparatus of claim 3 wherein said drive bars are connected to a point intermediate the ends of an associated hydraulic cylinder.

8. The apparatus of claim 4 wherein said drive bars are connected to a point intermediate the ends of an associated hydraulic cylinder.

9. A method for minimizing the effect of wind forces on helicopter blades and supporting structure comprising the steps of:

providing a plurality of hydraulic cylinders each with hydraulic fluid therein and having first and second ends;

providing a plurality of piston shafts, each of said piston shafts movable only through a first end of its associated hydraulic cylinder;

connecting said plurality of piston shafts to an associated helicopter blade;

connecting a hydraulic tube only from a second end of an associated hydraulic cylinder to a second end of a further hydraulic cylinder;

whereby hydraulic fluid may flow between said hydraulic cylinders as said movable piston shafts extend through one end of an associated hydraulic cylinder toward or away from an associated blade due to said wind forces Impinging on said helicopter blades.

10. The method of claim 9 further comprising the steps of:

providing a manifold;

providing said hydraulic tube as a plurality of tubes; and connecting each of said plurality of tubes at one of their ends to said second end of an associated hydraulic cylinder and at their other ends to said manifold.

11. The method of claim 9 further comprising the steps of:

providing a plurality of drive bars;

connecting each of said plurality of drive bars to an associated one of said plurality of hydraulic cylinders.

12. The method of claim 10 further comprising the steps of:

providing a plurality of drive bars;

connecting each of said plurality of drive bars to an associated one of said plurality of hydraulic cylinders.

13. The method of claim 11 further comprising the step of:

connecting said drive bars to an end of an associated hydraulic cylinder.

14. The method of claim 12 further comprising the steps of:

connecting said drive bars to an end of an associated hydraulic cylinder.

15. The method of claim 11 further comprising the step of:

connecting said drive bars to a point intermediate the ends of an associated hydraulic cylinder.

16. The method of claim 12 further comprising the step of:

connecting said drive bars to a point intermediate the ends of an associated hydraulic cylinder.

* * * * *